United States Patent [19]
Mitchell

[11] Patent Number: 5,789,916
[45] Date of Patent: Aug. 4, 1998

[54] METHOD AND APPARATUS FOR IMPROVING READHEAD PERFORMANCE

[75] Inventor: John G. Mitchell, Ovid, N.Y.

[73] Assignee: Axiohm IPB Inc., Ithaca, N.Y.

[21] Appl. No.: 594,927

[22] Filed: Jan. 31, 1996

[51] Int. Cl.$^6$ .............................. G01R 35/02; G06K 7/08
[52] U.S. Cl. ........................................... 324/202; 235/449
[58] Field of Search ........................... 324/202, 207.13, 324/228, 235, 225, 207.12; 360/31; 235/449

[56] References Cited

U.S. PATENT DOCUMENTS

| | | | |
|---|---|---|---|
| 2,531,807 | 11/1950 | Pangher | 324/202 |
| 5,315,246 | 5/1994 | Jeffers | 324/228 |
| 5,488,293 | 1/1996 | Ross | 324/202 |
| 5,517,111 | 5/1996 | Shelor | 324/202 |

*Primary Examiner*—Sandra L. O'Shea
*Assistant Examiner*—Roger Phillips
*Attorney, Agent, or Firm*—Salzman & Levy

[57] ABSTRACT

The present invention features a method and a fixture for determining the asymmetrical character of a readhead prior to its installation in a check-validation machine. Such a machine that is used to validate checks uses a stepper motor drive to convey the check past the readhead. The magnetic field produced by the coil of the stepper motor interferes with the capability of the readhead to recognize the magnetic indicia on the check. Once determined, the asymmetrical sensitivity of the readhead towards the magnetic flux allows the manufacturer to mount the readhead with its sensitive side away from the stepping motor of the validating unit. The readhead asymmetry is determined by the method of this invention by measuring an output voltage pulse of the readhead, when it is excited by magnetic pulses both forward and rear of its read gap. The excitation is provided approximately one inch from the read gap. The exciting pulses are of similar magnitude and timing as that of the signal field generated by the slip drive of the stepper motor. The peaks of the forward and rear output pulses are converted into DC voltage levels, which are then fed into a comparator circuit. The comparator circuit controls the lighting of a "go/no go" indicator LED, which tells the operator which side of the readhead is more sensitive to the magnetic flux.

8 Claims, 7 Drawing Sheets $V_{1pk} > V_{2pk}$ $V_{1pk} = {\sim}V_{2pk}$ $V_{1pk} < V_{2pk}$

METHOD AND APPARATUS FOR IMPROVING READHEAD PERFORMANCE

FIELD OF THE INVENTION

The invention pertains to readhead performance on check-validating equipment and, more particularly, to a method and fixture for adjusting the orientation of readheads on check-validation machines, so that the indicia being scanned and read are more accurately interpreted in an environment of electromagnetic interference.

BACKGROUND OF THE INVENTION

It has recently become useful for tradespeople at retail establishments and markets to validate their customers' checks. Prevalent in commercial usage now are small, desktop machines that print receipts for transactions and validate customer checks. One such machine is Model No. 7156 thermal receipt-impact slip printer manufactured by Axiohm Corporation of Ithaca, N.Y.

A check to be validated is fed into the above-identified machine by a stepper motor drive unit. The check is driven into the machine until all of the magnetizable ink numbers have passed through a magnetizing unit. Then, without stopping, the stepper motor is reversed, and the machine discharges the check at a constant speed. During the discharge phase, the magnetic ink numbers on the check's surface pass over a readhead and are sensed and decoded.

It has been discovered in the course of manufacturing these validating machines that each installed readhead has a more susceptive side, i.e. the readheads have an asymmetrical sensitivity to interferences. The more sensitive side of the readhead has been found to be receptive to the magnetic flux generated by the coils of the adjacent stepper motor. With an improper orientation, the magnetic interference is sufficient to prevent effective interference reduction, required for the readhead to sense the magnetic indicia of the checks accurately.

Moreover, it has been determined that the accuracy of reading magnetic numbers on checks can be enhanced, if the orientation of the readhead is selected prior to installation. Proper alignment of the readhead on the printer minimizes magnetic field interference susceptibility and provides better indicia recognition. The inventive method also eliminates the prior costly procedure of replacing a misoriented readhead.

It is an object of this invention to provide a method of determining the asymmetrical character of a readhead and, thereafter, to provide for its proper orientation on a check-validation machine.

SUMMARY OF THE INVENTION

In accordance with the present invention, there are provided a method and a fixture for determining the asymmetrical character of a readhead prior to its installation in a check-validation machine. A readhead has a greater receptivity on one of its sides to external magnetic interferences. A machine that is used to validate checks uses a stepper motor drive to convey the check past the readhead. The pulsating magnetic field produced by the coils of the stepper motor interferes with the capability of the readhead to recognize the magnetic indicia on the check. Once determined, the asymmetrical receptivity of the readhead toward the magnetic flux allows the manufacturer to mount the readhead with its more sensitive side positioned away from the stepping motor of the validating unit. This mounting orientation also determines the necessary connections of the readhead. Orienting the readhead in such a manner allows a more complete interference cancellation adjustment for a more accurate recognition of the check indicia by the check-validation machine.

This readhead asymmetry is determined by the method of this invention, which is accomplished by measuring the output voltage pulses of the readhead when it is excited by magnetic pulses both forward and rear of its read gap. The excitation is provided approximately one inch away from the read gap. The exciting pulses are of similar magnitude and timing as that of the signal field generated by the slip drive stepper motor. The peaks of the forward and rear output pulses are converted into direct current (DC) voltage levels, which are then fed into a comparator circuit. The comparator circuit controls the lighting of a "go/no go" indicator LED, which instructs the operator as to which side of the readhead is more sensitive to extraneous magnetic flux.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention features a method and a fixture for determining the asymmetrical character of a readhead. It has been discovered that readheads have an asymmetrical receptivity to external magnetic interference. Once the asymmetry is determined, the readhead can be mounted on a check-validation machine with the proper orientation befitting reduced magnetic interference, which facilitates accurate sensing of a check's magnetic indicia.

Figure 1:
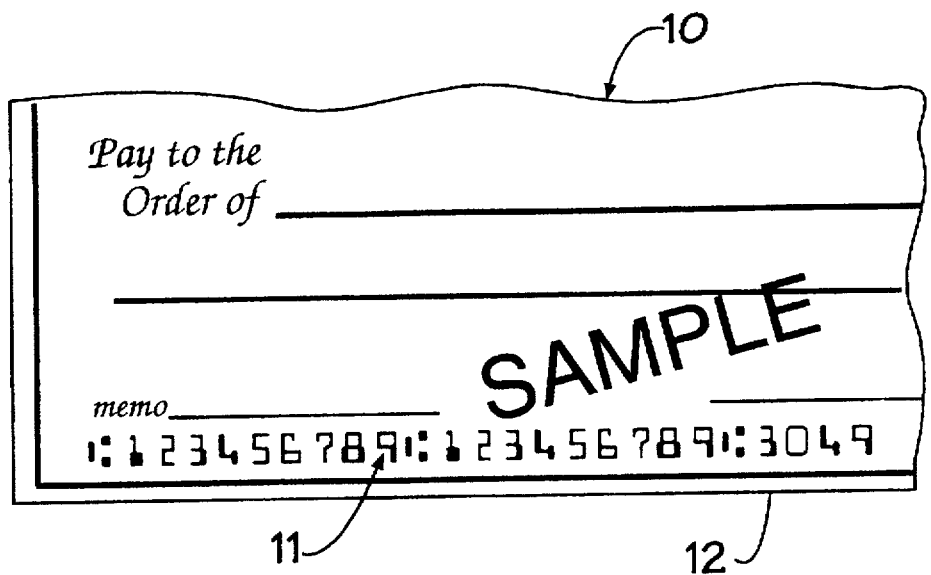
FIG. 1 depicts the face of a typical check having a series of magnetically-coded numbers disposed along one edge thereof.

Now referring to FIG. 1, the face of a typical check 10 is illustrated. Magnetizable ink numbers 11 are disposed on the lower edge 12, as shown.

Figure 2:
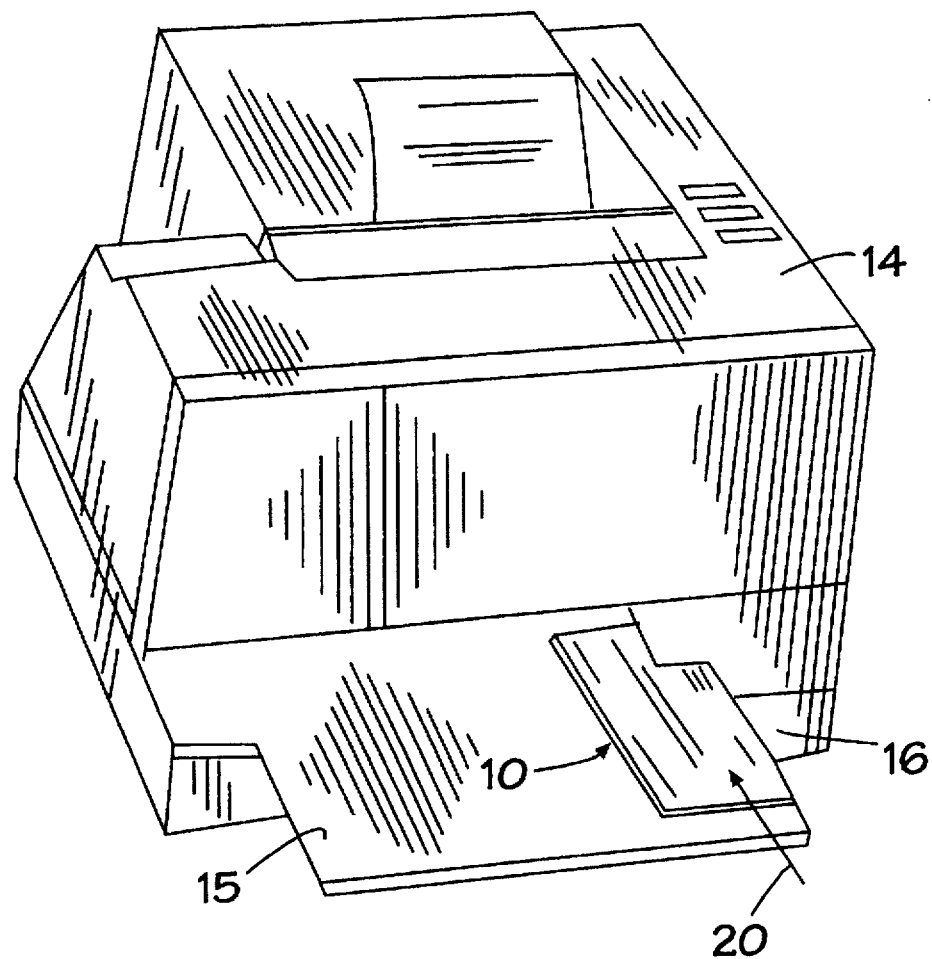
FIG. 2 illustrates a frontal, perspective view of the check-validation machine used in conjunction with this invention, with an in situ view of the check shown (upside-down, for identification) in FIG. 1, as it is being introduced into the machine for validation.

Referring to FIG. 2, a check-validation machine 14 of this invention is shown. This check-validation machine 14 has a flat slip table 15, upon which the check 10 (shown in FIG. 1) is positioned. The check 10, shown upside-down in this FIGURE for purposes of identification herein only, is guided into the machine 14 by a vertical guide wall 16 disposed on the right-hand side of the machine 14. The check is pushed by hand (arrow 20) into the machine 14, until the frontal edge 17 of the check 10 reaches the slip stop (see FIG. 3) disposed therein.

Figure 3:
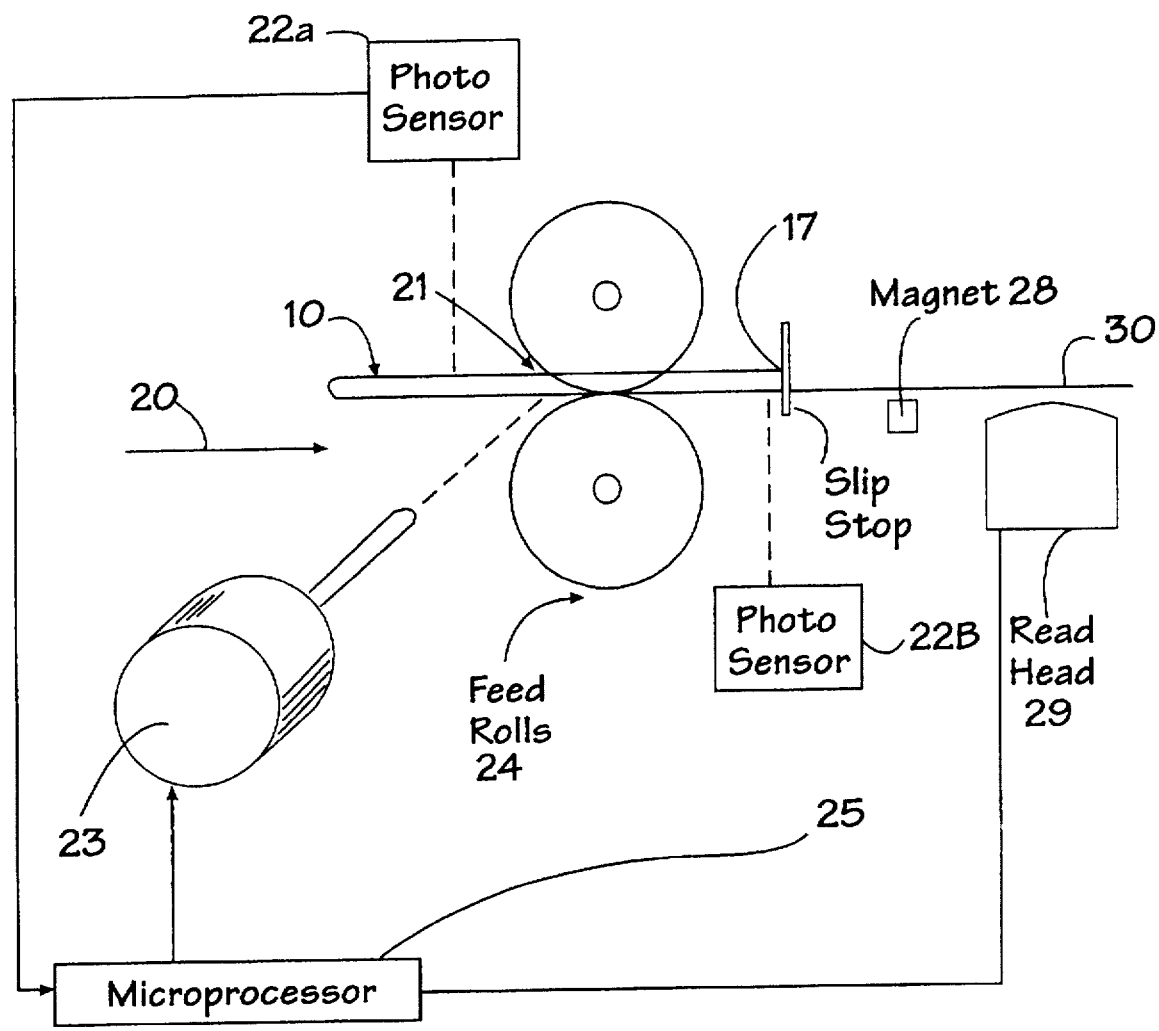
FIG. 3 shows a schematic view of the transport path of the check as it is being fed into the check-validation machine illustrated in FIG. 2.

Referring to FIG. 3, the internal feed path 30 for the check 10 as it enters (arrow 20) the machine 14 is shown in a schematic diagram. A photo-sensor 22B, positioned adjacent the nip 21 of feed rollers 24, detects the forward edge 17 of the check 10, and generates a signal that initiates a microprocessor-controlled feed sequence. The microprocessor 25 closes the feed rolls, lowers the slip stop and sends pulses via an electric circuit (not shown) to the stepper motor 23, which then rotatively actuates the feed rollers 24 through appropriate gearing (not shown). The stepper motor 23 is a 5-volt, DC, permanent magnet, 7.5° stepper, Model No. 17BB-H262-03, manufactured by Minebea Company, Ltd., of Thailand.

The check 10 is fed forward (arrow 20) along feed path 30, passing a magnet 28 that magnetizes the ink numbers on the check 10. The check 10 and the magnetized ink numbers 11 (FIG. 1) then pass over a readhead 29, as shown. The ink numbers 11 are not read during the forward movement of the check 10, but, rather, when the stepper motor 23 reverses direction and discharges the check 10.

Figure 4:
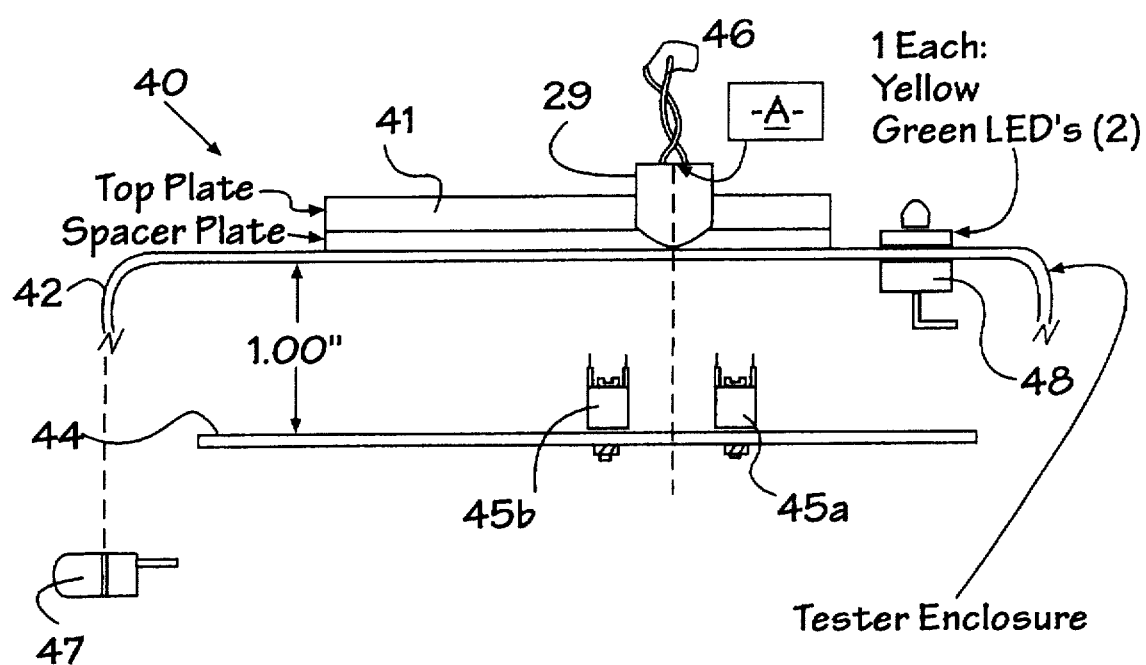
FIG. 4 depicts a side view of a testing unit used to determine the asymmetrical character of a readhead.
Figure 5:
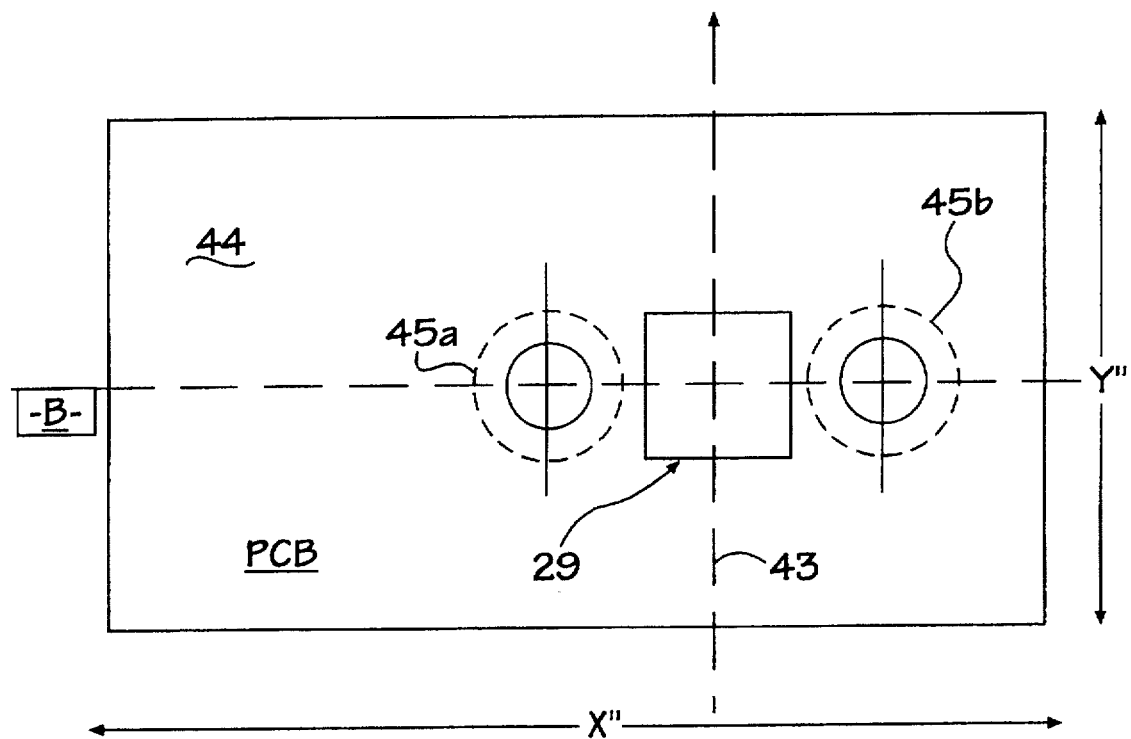
FIG. 5 illustrates a top view of the coil-mounting plate used for the testing unit shown in FIG. 4.
Figure 6A:
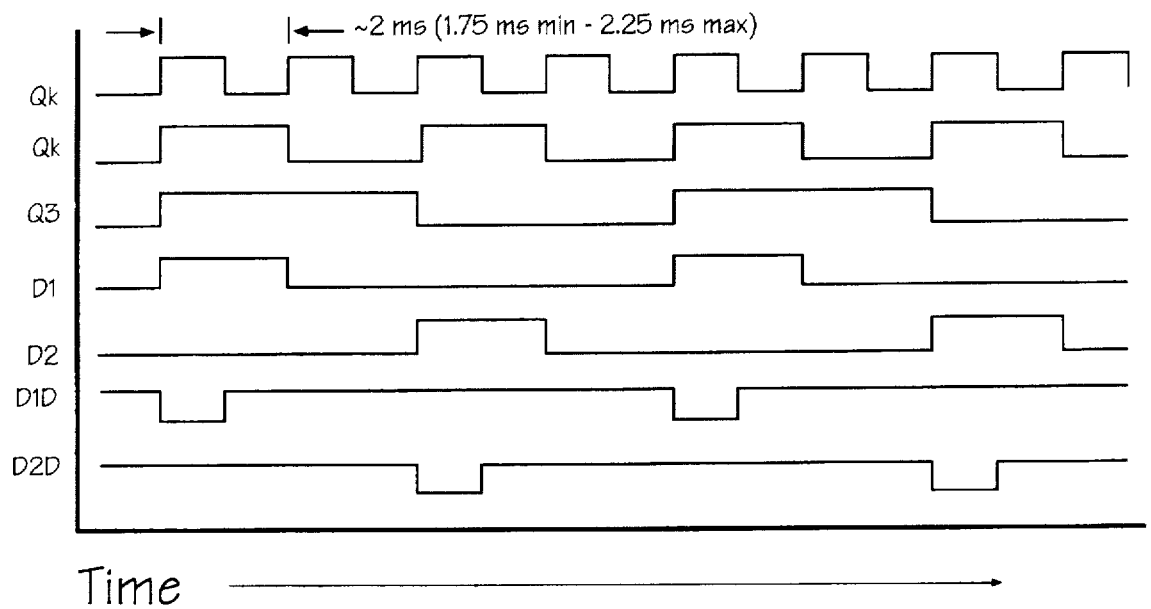
FIGS. 6a and 6b show graphical diagrams of structure and DC signals that are produced, by readhead excitation, with magnetic signals that are representative of stepper motor drive pulses.
Figure 6B:
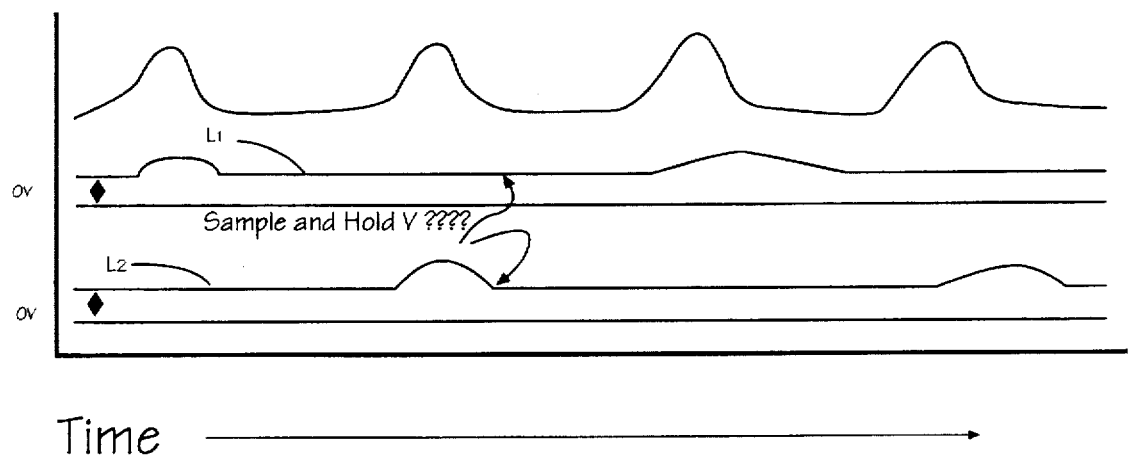

Referring to FIGS. 4, 5 and 6, a test unit 40 is shown in a side view. The test unit 40 is designed to determine the asymmetrical characteristics of the readhead 29. The test unit 40 comprises a non-magnetic mounting plate 42, upon which the readhead 29 to be tested is supported within a fixture 41. The fixture 41 is designed to place the middle of the readhead 29 along a plane 43 which lies midway between two excitation coils, 45a and 45b, respectively. The excitation coils 45a and 45b are mounted on plate 44 (FIG. 5), disposed one inch below mounting plate 42. Wires 46 of the readhead 29 are plugged into a connector 47 that is electrically connected to a pair of "go/no go" LEDs 48, via an amplifying and comparator circuit (not shown). The excitation coils 45a and 45b are individually and separately excited, using pulsing that, both in magnitude and timing, emulates the interference signal field of the slip drive stepping motor 23.

The excitation of the coils 45a and 45b causes the readhead 29 to generate respective voltage signals $L_1$ and $L_2$, as illustrated in FIG. 6. The voltage signal is sent to an amplifying and comparator circuit (not shown), which amplifies the readhead signals and then lights one of the pair of indicator LEDs 48.

The operation of the circuit has two stages: the first stage determines whether the readhead wires are connected with the correct polarity, given the physical orientation of the read head in the test fixture's receptacle. If correct, the yellow LED will be on; if wrong, neither LED will be on.

Figure 7A:
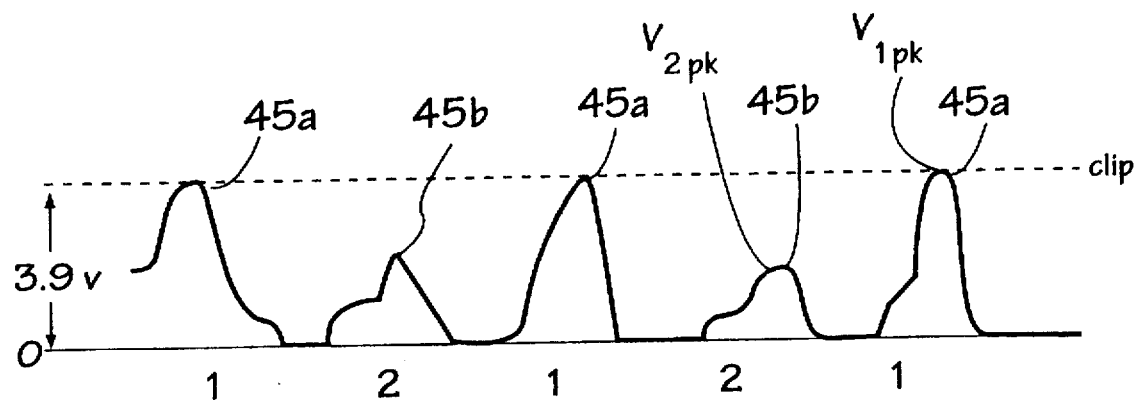
FIGS. 7a, 7b and 7c depict amplified pulse signals from excited readheads having different sensitivity symmetries.
Figure 7B:
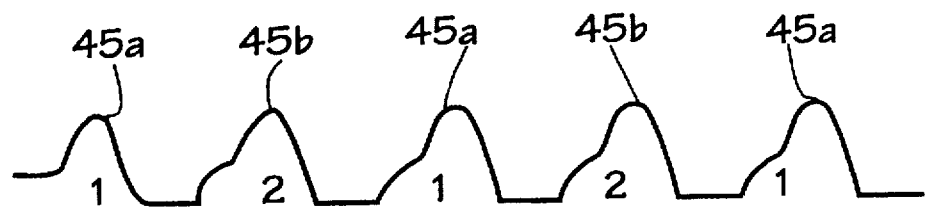
Figure 7C:
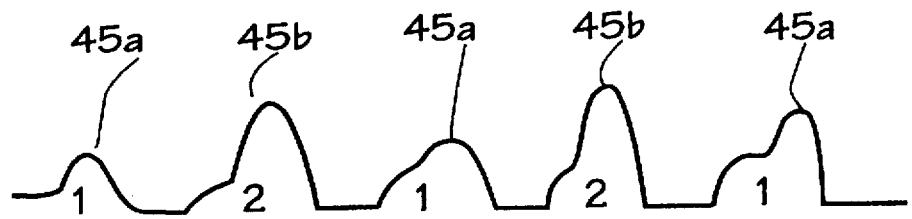

Referring to FIGS. 7a, 7b and 7c, respective amplified signals are shown for different readhead symmetries for readheads that are positioned and connected correctly (i.e., the yellow LED is on). When coils 45a and 45b are alternately excited, a perfectly symmetrical readhead 29 will produce amplified signals of equal pulse heights, as illustrated in FIG. 7b. A symmetrically susceptive readhead 29 will light the green member of the pair of LEDs 48 (FIG. 5) to indicate a "go" condition.

The signals generated in FIG. 7c depict a readhead 29 that is unsymmetrical, with a rear-directed bias, i.e., a rear sensitivity to external magnetic signals. Such a pattern of signals is acceptable, and will cause the green member of the pair of LEDs 48 to indicate a "go" condition. The readhead 29 producing this "go" signal will then be marked on the top side of the readhead face, per the mark indicator shown on the testing unit 40. The marked readhead will be assembled into the check-validation machine 14 per the assembly process instruction for marked readhead installation.

The signals generated in FIG. 7a illustrate a readhead 29 that, although correctly polarized, has a forward bias (i.e., a forward sensitivity to external magnetic signals). Such a pattern of signals is unacceptable, and will show a lighted yellow LED only to indicate a "no-go" condition. The test unit operator is then instructed to reverse both the physical orientation of the readhead 29 in the testing unit 40 receptacle and to also reverse the readhead connection to the tester. There should now be verification by lighted yellow and green LEDs 48 that the readhead is now properly oriented for the check-validation machine application. Readheads having a very large negative (front) bias (i.e., a bias greater than—0.25 VDC), would have been unacceptable in the past and, most probably, would have been discarded. Such readheads can now be used.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of fabricating a check-validation machine with readheads having proper orientation for sensing magnetic indicia, comprising the steps of:
   a) determining an asymmetrical sensitivity characteristic of a readhead to be used to read magnetic indicia of a check to be validated in a check-validation machine, said asymmetrical sensitivity characteristic being a sensitivity to external magnetic interference, and including the steps of:
      i) mounting said readhead between two excitation means, with each excitation means producing a magnetic flux;
      ii) exciting each of said two excitation means separately and individually so as to cause respective signals to be generated in said readhead; and
      iii) using said generated signals of step (ii) to determine the asymmetrical characteristic of said readhead; and
   b) using the sensitivity characteristic determined in step (a) to orient said readhead on said check-validation machine, so that said sensitivity to external magnetic interference is minimized, whereby interference null adjustment of said readhead can be performed efficiently without necessitating the replacement thereof.

2. The method in accordance with claim 1, wherein said exciting substep (ii) includes the substeps of:
   (ii$_1$) comparing said generated signals; and
   (ii$_2$) providing an indication of any disparity in an amplitude of said signals to indicate an asymmetry.

3. The method in accordance with claim 1, wherein said mounting substep (i) comprises fixturing said readhead approximately midway between two excitation coils.

4. The method in accordance with claim 1, wherein said two excitation means comprise first and second coils, and said exciting substep (ii) comprises the further substep of:

(ii₁) exciting each of said first and second coils with a signal simulating, both in magnitude and time, drive motor pulsing.

5. A method of fabricating a check-validation machine with readheads having proper orientation for sensing magnetic indicia, comprising the steps of:

a) mounting a readhead in a fixture between two excitation means, with each excitation means producing a magnetic flux;

b) exciting each of said two excitation means separately and individually to cause respective signals to be generated in said readhead;

c) using said generated signals of step (b) to determine an asymmetrical characteristic of said readhead; and d) orienting said readhead within said check-validation machine with a proper orientation for effective interference cancellation.

6. The method in accordance with claim 5, wherein said using step (c) includes the substeps of:

(i) comparing said generated signals; and (ii) providing an indication of any disparity in an amplitude of said signals to indicate an asymmetry.

7. The method in accordance with claim 5, wherein said mounting step (a) comprises fixturing said readhead approximately midway between two excitation coils.

8. The method in accordance with claim 5, wherein said two excitation means comprise first and second coils, and said exciting step (b) comprises the further substep of:

(i) exciting each of said first and second coils with a signal simulating, both in magnitude and time, drive motor pulsing.

\* \* \* \* \*